United States Patent Office 3,138,618
Patented June 23, 1964

3,138,618
GLYCIDYL ETHERS OF 3-CYCLOHEXENE-1,1-DIMETHANOLS
Erwin Nikles, Basel, Hans Batzer, Arlesheim, and Willy Fatzer, Bottmingen, Switzerland, assignors to Ciba Limited, Basel, Switzerland, a Swiss firm
No Drawing. Filed Mar. 14, 1960, Ser. No. 14,508
Claims priority, application Switzerland Mar. 17, 1959
5 Claims. (Cl. 260—348)

The present invention provides new glycidyl ethers of unsaturated dialcohols of the general formula (I)
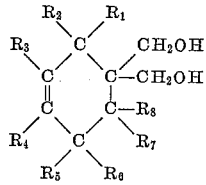

in which $R_1$ to $R_8$ each represent monovalent substituents, such as halogen or hydrogen atoms or aliphatic, cycloaliphatic, araliphatic or aromatic hydrocarbon radicals, preferably lower alkyl radicals with 1 to 4 carbon atoms, and $R_1$ and $R_5$ together may also represent a bivalent substituent, such as a methylene group.

According to the present process these new glycidyl ethers are prepared by reacting a dialcohol of the formula (I) with an epihalohydrin or dihalohydrin, preferably with epichloro-hydrin.

Particularly readily accessible are the glycidyl ethers of unsaturated dialcohols of the formula (II)
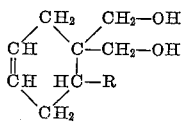

in which R represents a hydrogen atom or a lower alkyl radical.

As examples of unsaturated dialcohols of the Formulae I and II respectively may be mentioned 1:1-dimethylol-cyclo-hexene-3, 1:1-dimethylol - 6 - methyl-cyclohexene-3, and 1:1-dimethylol-2:5-endomethylene-cyclohexene-3.

The reaction of the dialcohol (I) with an epihalohydrin can be carried out in the usual manner, either in one stage or preferably in two stages. When the process is performed in one stage, the reaction of the dialcohol with the epihalohydrin is carried out in the presence of an alkali, preferably sodium hydroxide or potassium hydroxide. In this one-stage process the epichlorohydrin to be reacted according to the present invention may be replaced wholly or partially by dichlorohydrin which, under the conditions employed and when a suitable addition of alkali is made, is intermediately converted into epichlorohydrin which then reacts with the dialcohol. In the preferred two-stage process the dialcohol of the Formula I is reacted in a first stage with an epihalohydrin in the presence of an acidic catalyst, such for example as boron trifluoride, to form the halohydrin ether which latter is then dehydrohalogenated in the second stage by means of an alkali, such as potassium hydroxide for sodium hydroxide, to the glycidyl ether.

The reaction according to the present process always yields mixtures of glycidyl ethers. The content of glycidyl ether groups depends on the reaction conditions, primarily on the molecular proportion of epichlorohydrin relatively to the hydroxyl equivalent of the dialcohol. In general, it has been observed that the higher this molecular proportion the greater is the content of glycidyl ether groups. For every hydroxyl equivalent of the dialcohol, 1 to 3 molecular proportions of epichlorohydrin or dichloro-hydrin are used. The resulting mixtures contain glycidyl ethers of the general formula (III)
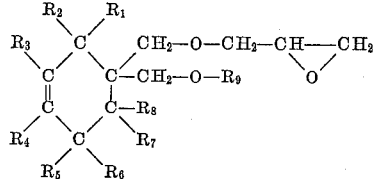

or of the formula (IV)
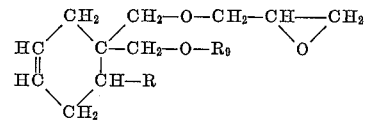

in which $R_1$ to $R_8$ and R have the same meanings as in the Formulae I and II respectively, and $R_9$ represents a hydrogen atom or the group

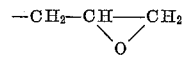

The resulting mixtures are as a rule used as they are. It is, however, also possible to isolate therefrom diglycidyl ethers of the general formula (V)
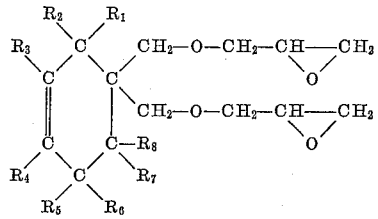

or of the formula (VI)
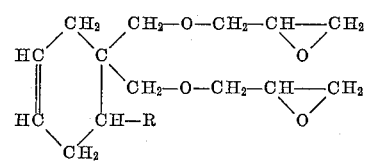

or monoglycidyl ethers of the general formula (VII)
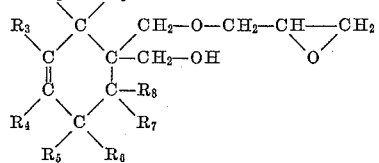

or of the formula (VIII)
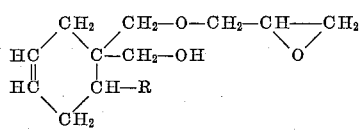

In the Formulae V and VII and VI and VIII respectively, the radicals $R_1$ to $R_8$ and R have the meanings defined in connection with the Formulae I and II.

The glycidyl ether mixtures and the glycidyl ethers isolated therefrom are advantageously defined by their content of glycidyl groups ("epoxide equivalents per kg.") and, if desired, also by their content of hydroxyl groups ("hydroxyl equivalents per kg.") and by the hydrolysable chlorine content and the chlorine content determined by combustion analysis ("chlorine equivalents per kg.").

The ethers of the invention, which contain epoxide groups, are thinly liquid at room temperature. The glycidyl ether mixtures, which can be used as they are, as well as the diglycidyl ethers isolated therefrom, react with the conventional hardeners for epoxy compounds and can be cross-linked or hardened with the addition of such hardeners, as can other polyfunctional epoxy compounds. As such hardeners may be mentioned basic or acidic compounds; particularly good results have been obtained with: Amines or amides, such as aliphatic and aromatic primary, secondary and tertiary amines, for example mono-, di- and tri-butylamines, para-phenylenediamine, ethylenediamine, hydroxyethyl ethylenediamine, N:N-diethyl-ethylenediamine, diethylene triamine, triethylene tetramine, trimethylamine, diethylamine, triethanolamine, Mannich's bases, piperidine, piperazine, guanidine and guanidine derivatives, such as phenyl-diguanidine, diphenylguanidine, dicyandiamide, urea-formaldehyde resins, melamine-formaldehyde resins, aniline-formaldehyde resins, polymers of aminostyrenes, polyamides, for example those formed with dimerised or trimerised unsaturated fatty acids, isocyanates, isothiocyanaes, phosphoric acid, polybasic carboxylic acids, and anhydrides thereof, for example phthalic anhydride, methylendomethylene-tetrahydrophthalic anhydride, dodecenylsuccinic anhydride, hexahydrophthalic anhydride, hexachloroendomethylene - tetrahydrophthalic anhydride or endomethylene-tetrahydrophthalic anhydride or mixtures thereof, maleic or succinic anhydride; polyhydric phenols, for example resorcinol, hydroquinone, quinone, phenol-aldehyde resins, oil-modified phenol-aldehyde resins; reaction products of aluminium alcoholates or phenolates with compounds of tautomeric reaction of the type of acetoacetic acid esters; Friedel-Crafts catalysts, such as aluminium trichloride, antimony pentachloride, tin tetrachloride, ferric chloride, zinc chloride, boron trifluoride and complexes thereof with organic compounds. The monoglycidyl ethers by themselves likewise react with the afore-mentioned hardeners, but in most cases this is accompanied by the formation of linear reaction products that have not undergone cross-linking; they can be hardened or cross-linked, respectively, for example with polybasic carboxylic acids or anhydrides thereof. The term "hardening" as used in this context signifies the conversion of the glycidyl ethers into insoluble and infusible resins.

The hardenable glycidyl ethers, and their mixtures with hardeners, can be mixed at any desired stage with fillers, plasticisers, coloring matter or the like. Suitable extenders and fillers are, for example, asphalt, bitumen, glass fibers, mica, quartz powder, cellulose, kaolin, finely divided silicic acid (AEROSIL) and metal powders.

The mixtures of a glycidyl ether of the invention with a hardener, with or without addition of a filler, can be used for the manufacture of lamination resins, lacquer coatings, casting resins, fillers and putties, moulding compounds and adhesives.

The new glycidyl ethers can also be used as intermediates and as active diluents or modifiers for the known epoxy resins such as are obtained, for example, by reacting epichlorohydrin in an alkaline medium with a polyhydric phenol, such as resorcinol or bis-[4-hydroxyphenyl]-dimethylmethane.

In the afore-mentioned applications the glycidyl ether mixtures are preferably used in the form resulting from the reaction so that there is no need of isolating the monoglycidyl or diglycidyl ethers by fractional distillation.

In the following examples parts and percentages are by weight. The epoxide contents, expressed by epoxide equivalents per kg., have been determined by the method described by A. J. Durbetaki in Analytical Chemistry, volume 28, No. 12, December 1956, pages 2000–2001, with hydrogen bromide in glacial acetic acid.

*Example 1*

A solution of 852 parts of 1:1-dimethylol-cyclohexene-3 in 2500 parts by volume of chloroform is treated with 4 parts by volume of boron trifluoride ethyl etherate and the mixture is heated to 70° C. 1110 parts of epichlohydrin (molecular ratio dialcohol to epichlorohydrin=1:2) are then cautiously stirred in dropwise. After about ½ hour an exothermic reaction sets in. By suitably adjusting the rate of the dropwise addition the reaction mixture can be maintained at the boiling point of chloroform without external heating. On completion of the dropwise addition the reaction mixture is heated at 70° C. until epoxide can no longer be detected. 480 parts of alcoholic sodium hydroxide solution are then slowly added at room temperature, and within ½ hour the mixture is then agitated 2 to 3 times with water and finally with a small amount of a solution of 33 parts of monosodium phosphate in 100 parts of water (pH=5 to 6). The aqueous layers are extracted once or twice with chloroform, and the combined chloroformic extracts are dried over sodium sulfate, evaporated, and the residue is distilled under reduced pressure.

Yield: 1343 parts of a mixture of glycidyl ethers boiling at 120–150° C. under a pressure of 0.2 to 0.5 mm. Hg, containing 6.2 epoxide equivalents per kg.

*Example 2*

A solution of 852 parts of 1:1-dimethylol-cyclohexene-3 in 3000 parts by volume of benzene is treated with 15 parts by volume of boron trifluoride ethyl etherate and the mixture is heated to 70° C. 1110 parts of epichlorohydrin (molecular ratio dialcohol to epichlorohydrin=1:2) are then cautiously stirred in dropwise within about 2 hours. After about ½ hour an exothermic reaction sets in. By suitably adjusting the rate of the dropwise addition the reaction mixture can be maintained at the boiling point of benzene without external heating. On completion of the dropwise addition to the reaction mixture is stirred at 80° C. until epoxide can no longer be detected. While cooling with ice, 480 parts of ground sodium hydroxide are slowly added portionwise (within about 20 minutes) at a rate such that the internal temperature does not rise above 25° C. After having been stirred on for 1 hour, the reaction mixture is repeatedly agitated with about 1000 parts by volume of water on each occasion until the washings run practically neutral, which is the case after about 4 washes. The washings are extracted with about 1000 parts by volume of benzene. The benzolic extracts are combined, dried over sodium sulfate, and the benzene is distilled off, to yield 1469 parts of a crude product containing 5.5 epoxide equivalents per kg.

The crude product was distilled (without using a fractionating column) under a pressure of about 0.05 mm Hg, and the following fractions were isolated:

(a) Starting fractions (boiling range 92–107° C.) containing less than 6.5 epoxide equivalents per kg.,
(b) Middle fractions (boiling range 110–130° C.) containing over 6.5 epoxide equivalents per kg., and
(c) Final fractions (boiling range 130–170° C.) containing less than 6.5 epoxide equivalents per kg.

By separate micro-fractionation of these three fractions under a pressure of 0.02 to 0.05 mm. Hg with the use of a fractionating column, the following fractions were then isolated:

(d) Boiling range 79–84° C. under 0.02–0.04 mm. Hg pressure, which proved to be monoglycidyl ether of 1:1-dimethylol-cyclohexene-3, containing 5.0 to 5.15 epoxide equivalents per kg. (theory: 5.04).

*Analysis.*—$C_{11}H_{18}O_3$—molecular weight 198.25: Calculated: C, 66.64; H, 9.15%. Found: C, 66.77; H, 9.15%.

(e) Boiling range 103–115° C. under about 0.05 mm. Hg, which proved to be diglycidyl ether of 1:1-dimethylol-cyclohexene-3 containing 7.4–7.8 epoxide equivalents per kg. (theory: 7.86).

*Analysis.*—$C_{14}H_{22}O_4$—molecular weight 254.32: Calculated: C, 66.11; H, 8.72%. Found: C, 66.05; H, 8.69%.

Example 3

624 parts of molten 1:1-dimethylol-6-methyl-cyclohexene-3 are mixed with 1000 parts by volume of benzene, treated with 5 parts by volume of boron trifluoride ethyl etherate of about 48% strength, and the whole is heated to the boil. 740 parts of epichlorohydrin are then stirred in dropwise at a rate such that the mixture keeps boiling without external heating. During this operation the temperature rises from 78 to 87° C. The mixture is allowed to cool to room temperature, and within about ½ hour 328 parts of powdered sodium hydroxide of 97.5% strength are vigorously stirred portionwise into the reaction mixture. The temperature is maintained at 25–30° C. by external cooling with ice. The mixture is then stirred on for 1½ hours at 24° C. The sodium chloride formed is filtered off, and the filtrate is evaporated on a boiling water bath, towards the end in a high vacuum.

There are obtained 982 parts of a mixture of glycidyl ethers containing 5.46 epoxide equivalents per kg. Distillation at 133–145° C. under 0.03 mm. Hg pressure yields a product containing 6.27 epoxide equivalents per kg.

When the process described in the above example is performed, instead of with 1:1-dimethylol-6-methyl-cyclo-hexene-3, with 25.2 parts of 1:1-dimethylol-methyl-2:5-endo-methylene-cyclohexene-3 (prepared by reacting formaldehyde with the Diels-Alder adduct of commercial methyl-cyclopentadiene and acrolein in the presence of an alkali) reacted with 27.8 parts of epichlorohydrin, and the reaction product is dehydrohalogenated with 12.4 parts of powdered sodium hydroxide, a glycidyl ether is obtained which contains 3.52 epoxide equivalents per kg.

Example 4

100 parts of the glycidyl ether prepared as described in Example 1 are mixed with 15.5 parts of cresyl glycide 102.5 parts of a liquid mixture containing 78% of hexahydrophthalic anhydride, 13% of tetrahydrophthalic anhydride and 9% of phthalic anhydride, which latter mixture has been prepared by melting the reactants and then cooling to room temperature and 1 part of tris-[dimethyl-amino-methyl]-phenol.

The mixture was a viscosity of 100 centipoises at 23° C., which rises to 1500 centipoises after 60 hours' storing at 23° C. The mixture is hardened in an aluminium mould for 16 hours at 80° C. and then for 20 hours at 120° C. The resulting casting has the following properties:

Impact bending strength _____ cmkg./cm.$^2$ __ 16.3
Bending strength _____ kg./mm.$^2$ __ 11.5
Water-absorption after 4 days_____ percent___ 0.15
Shear strength _____ kg./mm.$^2$ __ 1.59

A film prepared by casting and then hardening the above mixture displays good resistance to 5 N-sulfuric acid, 5 N-sodium hydroxide solution and water.

Example 5

The glycidyl ether prepared according to Example 1 (=Resin A) is used as an active diluent for an epoxy resin which is liquid at room temperature and contains 5:1 epoxide equivalents per kg., and has been prepared by reacting epichlorohydrin with bis-[4-hydroxyphenyl]-dimethylmethane (=Resin B).

In the following table is shown the viscosity-diminishing effect obtained with different proportions of the ingredients. In each case per 1 epoxide equivalent of the mixture 0.85 molecular proportion of methylenedomethylene-tetrahydrophthalic anhydride was added as hardener, and 0.5% of tris-[dimethyl-amino-methyl]-phenol—calculated on the amount of anhydride used—as hardening accelerator. In all experiments hardening was performed for 20 hours at 120° C. The properties of the resulting castings are likewise shown in the following table:

| Parts of Resin A | Parts of Resin B | Viscosity at 20° C. | | Impact bending strength, cmkg./cm.$^2$ |
|---|---|---|---|---|
| | | Resin mixture | Resin+ hardener+ accelerator | |
| ------ | 100 | 24,000 | 4,200 | 8.7 |
| 30 | 70 | 1,740 | 1,030 | 16.3 |
| 50 | 50 | 520 | 475 | 18.7 |
| 70 | 30 | 195 | 270 | 14.1 |

Example 6

A solution is prepared at room temperature in 100 parts of a glycidyl ether, obtained by micro-fractionation as described in Example 2, containing 7.5 epoxide equivalents per kg., of 1.75 parts of a sodium alcoholate prepared by dissolving 0.82 part of sodium metal at about 120° C. in 100 parts of 2:4-dihydroxy-3-hydroxymethyl-pentane. 111 parts (1.0 equivalent of anhydride group per equivalent epoxide group) of phthalic anhydride are melted in at 120–130° C. as hardener.

The resin+hardener mixture has at 120° C. a viscosity below 20 centipoises which rises to 1500 centipoises after 2 hours at 120° C. A first portion of the resin-hardener mixture is cast at about 120° C. in an aluminium mould, while a second portion is used as an adhesive. The latter experiments are carried out with degreased and ground aluminium sheets (170 x 25 x 1.5 mm.; 10 mm. overlap) commercially available under the trademark "Anticorodal B." The castings and bonded aluminium sheets are hardened for 24 hours at 140° C. The hardened castings and laminates have the following properties:

Impact bending strength _____ cmkg./cm.$^2$ __ >17.3
Bending strength _____ kg./mm.$^2$ __ 14.6
Thermal stability according to
  Martens DIN _____ °C __ 88
Shear strength _____ kg./mm.$^2$ __ 1.88

Example 7

Experiment 1 is carried out with a cycloaliphatic diepoxy compound of the formula

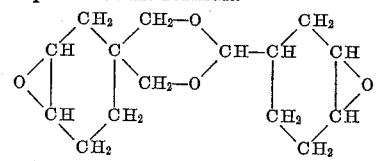

containing 6.08 epoxide equivalents per kg. (prepared by epoxidation with peracetic acid of the acetal from $\Delta^3$-tetrahydrobenzaldehyde and 1:1-dimethylol-cyclohexene-3). Experiment 2 is carried out with a mixture of 80 parts of the above cycloaliphatic diepoxide and 20 parts of the glycidyl ether obtained as described in Example 2 by micro-fractionation, containing 7.7 epoxide equivalents per kg. In each experiment 0.65 equivalent of phthalic anhydride per equivalent of epoxide group are melted in at 120–125° C. as hardener.

The resulting casting resin mixtures are cast at about 120° C. in aluminium moulds (40 x 10 x 140 mm.) and hardened for 24 hours at 140° C. As is shown in the following table, the addition of the glycidyl ether of the invention (Experiment 2) considerably lowers the viscosity and extends the potlife without substantially impairing the properties of the hardened castings.

| Experiment | Viscosity of resin or resin mixture at 23° C., in centipoises | Potlife at 120° C. up to 1,500 cp. in minutes | Impact bending strength, cmkg./cm.$^2$ | Bending strength, kg./mm.$^2$ | Thermal stability accdg. to Martens DIN, ° C. |
|---|---|---|---|---|---|
| 1 | >200,000 | 134 | 4.3 | 4.0 | 158 |
| 2 | 35,000 | 172 | 5.0 | 5.9 | 154 |

Example 8

50 parts of glycidyl ether prepared by micro-fractionation as described in Example 2, containing 7.65 epoxide equivalents per kg. and having a viscosity of 50 centipoises at 23° C., are mixed at room temperature with 50 parts of a mixture of 8.4 parts of dibutyl phthalate and 41.6 parts of epoxy resin B described in Example 5 (the latter mixture contains 4.25 epoxide equivalents per kg. and has a viscosity of 2000 centipoises at 23° C.). The resin mixture prepared in this manner has a viscosity of only 170 centipoises at 23° C. and is excellently suitable for use in casting, impregnating and laminating. As hardener there are used 17.7 parts of triethylene tetramine for every 100 parts of the resin mixture. The resin+hardener mixture is poured at room temperature into aluminium moulds (40 x 10 x 140 mm.) and hardened for 24 hours at room temperature and then for 24 hours at 40° C.

The properties of the hardened castings are as follows:

| | |
|---|---|
| Impact bending strength _____ cmkg./cm.² __ | >25 |
| Bending strength _____ kg./mm.² __ | 9.6 |
| Thermal stability according to Martens DIN _°C__ | 46 |

What is claimed is:
1. A glycidyl ether of the formula

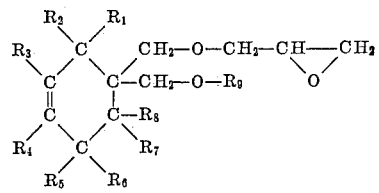

in which $R_1$ and $R_5$ taken together form a member selected from the class consisting of two hydrogen atoms, two lower alkyl radicals containing 1 to 4 carbon atoms and one methylene radical, $R_2$, $R_3$, $R_4$, $R_6$, $R_7$ and $R_8$ each represents a member selected from the class consisting of hydrogen atom and lower alkyl radical containing 1 to 4 carbon atoms, and $R_9$ is selected from the group consisting of hydrogen atom and the group

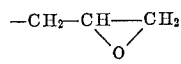

2. The compound of the formula

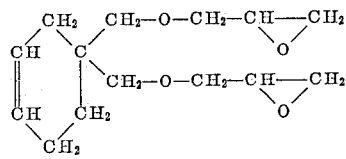

3. The diglycidyl ether of the formula

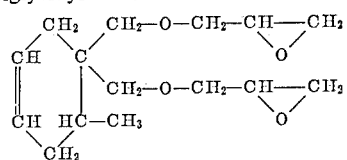

4. The monoglycidyl ether of the formula

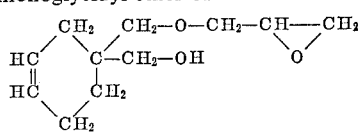

5. The monoglycidyl ether of the formula

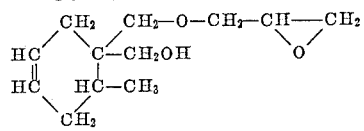

References Cited in the file of this patent

UNITED STATES PATENTS

| | | |
|---|---|---|
| 2,834,790 | Bressler et al. | May 13, 1958 |
| 2,925,403 | Shokal | Feb. 16, 1960 |
| 2,977,374 | Phillips et al. | Mar. 28, 1961 |
| 2,999,866 | Starcher et al. | Sept. 12, 1961 |

FOREIGN PATENTS

| | | |
|---|---|---|
| 1,153,284 | France | Sept. 30, 1957 |